Jan. 24, 1967 D. F. DOWNEY ETAL 3,300,571
VACUUM CLEANER HOSE HAVING ELECTRICAL CONDUCTORS
Filed May 18, 1965

INVENTORS
DAVID F. DOWNEY
JOHN J. MOUGHTY
BY
Thomas C. Butts
THEIR ATTORNEY

United States Patent Office 3,300,571
Patented Jan. 24, 1967

3,300,571
VACUUM CLEANER HOSE HAVING
ELECTRICAL CONDUCTORS
David F. Downey, Stamford, and John J. Moughty, Old
Greenwich, Conn., assignors to Electrolux Corporation,
Old Greenwich, Conn., a corporation of Delaware
Filed May 18, 1965, Ser. No. 456,655
5 Claims. (Cl. 174—47)

Our invention pertains, generally, to conductor-carrying wire-reinforced flexible hose or conduit and our principal object is to substantially reduce the length of the electrical conductors in the hose assembly in order to reduce both the voltage drop and the cost of the conductors in each hose assembly.

Another of our objects is to conceal the aforesaid conductors in a vacuum cleaner hose assembly in order to eliminate, or at least substantially reduce, unsightly bulges in the hose's outer sheath, which bulges are common in prior art hose assemblies in which the attempt has been made to conceal the conductors beneath the outer sheath.

Another of our objects is to incorporate the conductors in a hose assembly in such a way that conductors having different voltage levels are spaced at a maximum distance from each other.

For the purpose of illustrating our invention there is described hereinafter and shown in the accompanying drawing a suction hose intended for use with tank type vacuum cleaners. However, it is to be understood that the principles underlying our invention may be applied to other types of hose or conduit.

Presently, it is common practice in making a conductor-carrying flexible vacuum cleaner hose to initially wind a single steel wire in the form of a helix about a suitable mandrel. This helical wire in the completed hose assembly serves to reinforce the hose against being crushed when stepped upon or from collapsing inwardly when the inside of the hose is subjected to sub-atmospheric pressure. In addition, the helical reinforcing wire permits the hose to be flexed or bent quite readily. Afterward, a rubberized fabric, such as rubberized nylon friction sheeting, which serves as the carcass of the hose assembly, is wrapped about the helical reinforcing wire and the mandrel. Customarily, a jute cord is wound around the outside of the rubberized sheeting in order to tie it down preparatory to vulcanizing the entire assembly. The jute tiedown cord is helically wound in such manner that the turns of the tiedown cord on the outside of the rubberized wrapping or carcass are located between adjacent turns of the helical reinforcing wire. By winding the tiedown cord tightly against the rubberized wrapping a single helical groove containing the tiedown cord is formed along the length of the wire reinforced carcass on the outer surface thereof. Thereafter, the mandrel together with the assembled helical reinforcing wire, the rubberized wrapping and the helical tiedown cord are put into an autoclave and vulcanized. The vulcanizing process causes the rubberized wrapping or carcass to become bonded to itself as well as to the helical reinforcing wire and the helical tiedown cord. After the mandrel has been removed the carcass is covered with a sheath which may be braided over the outer surface of the carcass. The braided sheath protects the carcass and, in addition, it provides the completed hose assembly with a relatively smooth outer surface.

In general, electrical conductors are incorporated in the hose assembly in such a way that they are either visible or concealed.

When incorporated so as to be visible a two-wire electric cord is usually extended lengthwise along the hose on the outside surface of the braided sheath and it is secured thereto by means of straps tied around the hose. However, this has not proven entirely satisfactory. Since the cord is visible the hose assembly, as a whole, is somewhat unsightly. Moreover, the entire hose assembly is somewhat unwieldy because of its bulk and because the outside cord restricts the bending of the hose to some degree.

A variety of constructions have been tried for the purpose of concealing the conductors in the hose assembly. In one such construction the tiedown cord is removed from the carcass thereby emptying the helical groove in the outer surface of the carcass. Then, two insulated conductors are helically wound around the outside of the carcass in such a way that both conductors lie within the helical groove. Finally the outer sheath is braided over the carcass in order to conceal the conductors. However, this form of construction is poor because excessive lengths of conductors must be used since in each one foot length of carcass there are about ten turns of the helical groove. The overall length of the hose is about six feet and it has an average outer diameter of one and one-quarter inches. Thus, there are about sixty turns of the helical groove. Neglecting end length connections, about one hundred twenty turns of conductor are required. Therefore, the conductor lengths are enormously longer than the overall length of the hose. This is very costly and in addition the voltage drop is rather large. Other methods of concealing the conductors in the hose have necessitated the use of costly unconventional conductors, such as employing longitudinally extensible electric cords or using flat or strip-like electrical conductors. The use of extensible cord, when run axially along the carcass, causes noticeable bulges in the outer sheath of the hose. The flat strip-like conductor does not withstand bending as well as conventional round conductors.

According to an illustrative embodiment of our invention, we employ a plurality of at least three helical reinforcing wires, rather than a single helical reinforcing wire as reinforcement for the rubberized wrapping or carcass. Our helical wires each have substantially the same pitch and they are coaxially-arranged in such a way that each individual helical wire has its turns serially interspersed with the turns of the other helical wires. Such a serial interspersion provides a plurality of at least three individual coaxially-arranged helical spaces, each space having a pitch distance which is substantially the same as that of one of the helical reinforcing wires. When the wrapping or carcass is pulled inwardly through these helical spaces a short distance there is provided in the outside surface of the carcass at least three individual coaxially-arranged helical grooves. The interspersed assembly of helical wires gives the appearance of being a single helical reinforcing wire having a much smaller pitch than the pitch of any individual one of the helical wires. By way of contrast, if a single helical reinforcing wire were used and this single reinforcing wire had the same number of turns per linear foot as our interspersed assembly of helical wires appears to have, only one helical groove would be provided in the outside of the carcass and this one helical groove would have a much smaller pitch than any of the helical grooves of our interspersed assembly. Thus, if a helical electrical conductor is inserted in the one groove of the single wire reinforced hose, its length would be much greater than that of a conductor inserted in one of the grooves of the interspersed assembly of reinforcing wires.

In addition to enabling a substantial saving of conductors another feature of our construction, hereinbefore described, is that two separate electrical conductors may each occupy a separate groove thereby rendering imperceptible the bulging, if any, of the conductors against the sheath. By way of contrast in the hose which is reinforced with the single helical wire both conductors must occupy the same groove and necessarily the bulging of the sheath is quite noticeable.

Another feature of our invention is that if four or more reinforcing helical wires are used, there may be at least one empty helical groove separating the grooves containing the electrical conductors, thereby materially reducing the danger of a short circuit between two conductors.

Further objects and advantages of our invention will be apparent from the following description when considered in connection with the accompanying drawing which forms part of this specification and of which:

Figure 1:
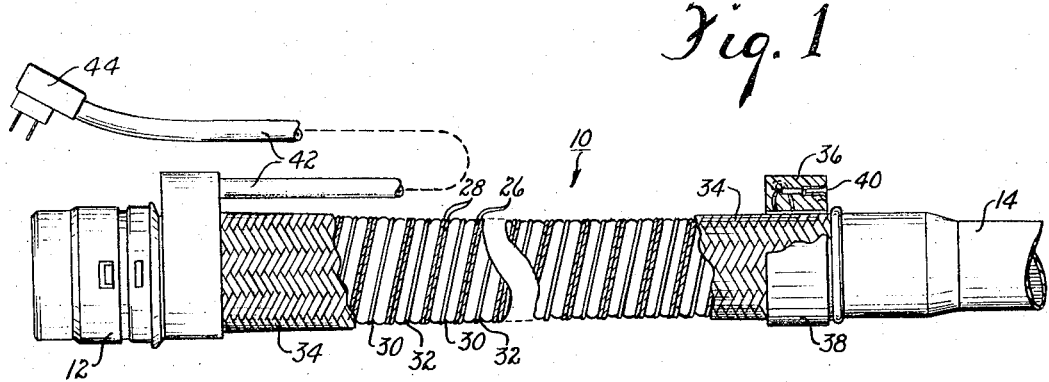
FIG. 1 is a partly cut-away view of a conductor-carrying vacuum cleaner hose in accordance with our invention.

In the drawings reference character 10 designates, generally, the vacuum cleaner hose which has secured to its opposite ends a coupling 12 and a short-hollow rigid tube 14. The coupling 12 is intended to be plugged into a suction inlet opening in a tank unit of a tank-type vacuum cleaner. The tube 14 is intended to be inserted into one end of a long hollow rigid wand which has a surface cleaning suction nozzle at its other end. Since they form no part of the invention, the tank unit, the hollow wand and the suction nozzle are not shown in the drawing.

Figure 2:
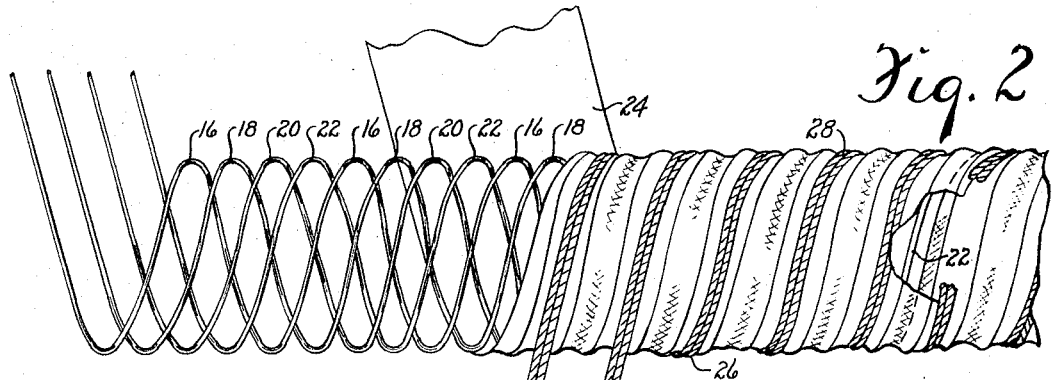
FIG. 2 is a somewhat enlarged view of a section of the hose showing it in partly completed form.
Figure 3:
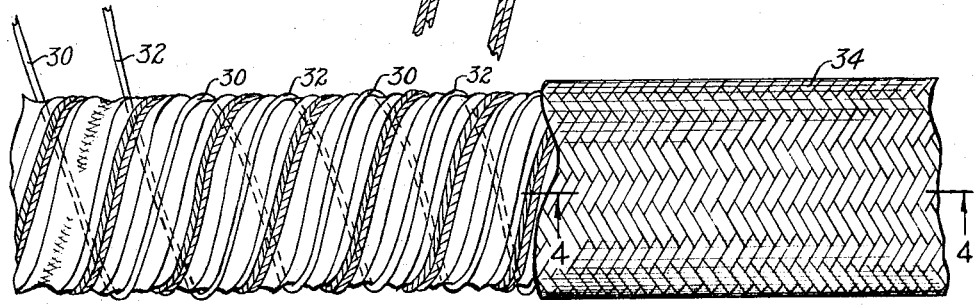
FIG. 3 is a somewhat enlarged view of a section of the hose showing it in almost completed form; and, FIG. 4 is a section view of the hose taken along the lines 4—4 in FIG. 3.
Figure 4:
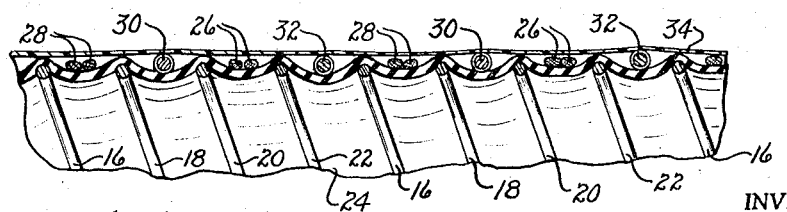

As shown in FIG. 2, four individual reinforcing wires 16, 18, 20 and 22 may be wound in the form of helixes on a mandrel (not shown) the mandrel may be cylindrical or it may be in the form of a tapered cylinder depending on whether a cylindrical hose or a tapered cylindrical hose is to be produced. All of the reinforcing wires have substantially the same pitch. That is, the axial distance traversed by a full turn of any of the helical reinforcing wires is substantially the same. In the space between a full turn of any one of the reinforcing wires there is located in series and axially spaced from each other a turn of each of the other three reinforcing wires. For example, in the space between a full turn of the wire 16 there is located a turn of each of the wires 18, 20 and 22. Moreover, substantially equal axial spacing obtains between the serially arranged turns of the various helical reinforcing wires. For example, the axial space between the neighboring turns of the wires 16 and 18 is substantially the same as the axial spaces between the neighboring turns of reinforcing wires 18 and 20, 20 and 22 and 22 and 16. Also, between a full turn of any individual reinforcing wire there are defined as many of these axial spaces as there are numbers of reinforcing wires used. For example, in FIG. 2 four individual reinforcing wires 16, 18, 20 and 22 are employed. Thus, in the space between a full turn of the reinforcing wire 16 there are also defined four spaces.

If one did not closely examine the assembly of interspersed helical wires or was not otherwise informed of the fact that a plurality of individual helical wires were used, the assembly would appear to be a single helical wire having a pitch distance which is one-fourth of what is the actual pitch of any one of the four helical wires. For example, the apparent pitch would be the axial spacing between the turns of the wires 16 and 18, or 18 and 20, or 20 and 22, or 22 and 16.

However, by serially interspersing the turns of the individual reinforcing wires, as hereinbefore described, the axial spaces between the neighboring turns form a plurality of individual coaxially-arranged helical spaces each of which has a pitch substantially the same as the actual pitch of any one of the four reinforcing wires. The pitch in the arrangement shown is four times the apparent pitch. By way of contrast with the conventional construction of the prior art in which a single helical reinforcing wire is used, the pitch of the single helical wire would be one-fourth of the pitch of any one wire of the interspersed arrangement of plural reinforcing wires.

Around the outside of the serially interspersed helical wires 16–22 there is tightly wound a wrapping 24 of rubberized material which forms the carcass of the hose assembly. As shown in FIG. 2, the wrapping 24 may be in the form of a tape and this tape is helically wound about the serially interspersed assembly of helical wires. The wrapping 24 may be a rubberized frictioned nylon tape and the helical reinforcing wires 16–22 may be copper coated steel. The copper coating enables the rubberized tape wrapping 24 to become firmly bonded to the helical reinforcing wires during the vulcanization process.

Two pairs of jute cords 26 and 28 and two insulated electrical conductors 30 and 32 are helically wound around the outside of the carcass 24. These cords and electrical conductors are pulled tightly against the carcass thereby pulling the carcass 24 inwardly through the individual helical spaces which are defined between the serially interspersed turns of the various helical reinforcing wires 16–22. As a result there is formed in the outside surface of the carcass 24 as many individual coaxially-arranged helical grooves as there are helical spaces. In the illustrative embodiment shown in the drawing, four individual helical grooves are formed. In the grooves defined between the wires 16 and 18 there is located the pair of tiedown cords 28. In the grooves between the wires 18 and 20 there is located the insulated conductor 30. In the grooves between the wires 20 and 22 there is located a pair of tiedown cords 26. In the groove between the wires 22 and 16 there is located the electrical conductor 32.

The aforesaid assembly comprising the carcass 24, the helical reinforcing wires 16–22, the conductors 30 and 32 and the pairs of jute cords 26 and 28 is inserted together with the mandrel about which they are wound in an autoclave and vulcanized. After vulcanization the mandrel is removed and an outer protective sheath 34 is braided over the carcass 24. The braided sheath 34 tightly surrounds the carcass and serves to hold each of the conductors and each pair of tiedown cords within their individual grooves.

While the pairs of tiedown cords 26 and 28 may be removed after vulcanization if desired, we have found that they adequately fill their respective grooves as do the individual conductors 30 and 32 so that the irregularity in the outer surface of the carcass is materially reduced. As a result when the sheath 34 is tightly braided over the carcass, the sheath's outer surface presents a smooth, pleasing appearance. Also, since each of the conductors 30 and 32 occupies its own separate groove any bulging of the conductors against the sheath is imperceptible.

A further feature of the hose according to our construction is that the two conductors 30 and 32 which have a substantial potential difference therebetween (e.g., 120 volts) are axially separated on the outside of the carcass by at least one helical groove. This axial spacing materially reduces the danger of a short circuit between the two conductors.

The most important feature of our invention resides in the substantial reduction of the length of the conductors required in comparison with the prior art hose assembly in which a single helical groove was provided for the retention of both conductors. Also, such a substantial reduction in the length of electrical conductors required in our hose materially reduces the voltage drop through the conductors. This substantial reduction of the conductor's length is achieved by substantially enlarging the pitch of the helical grooves by using a plurality of serially interspersed helical reinforcing wires in the manner hereinbefore described. In the illustrative embodiment shown in the drawings four helical reinforcing wires provide four helical grooves and each of these helical grooves has a pitch four times larger than the pitch which a single helical reinforcing wire of an equal number of turns per foot would have. By substantially increasing the pitch the length of the conductors required becomes substantially smaller.

Any suitable terminals may be provided for the conductors at the ends of the hose. As is shown in FIG. 1, the conductors at the right end of the hose are brought out through the braided sheath 34 and into a receptacle 36 which has a band 38 integral therewith and encircling the hose for securing the receptacle 36 to the hose. The conductors are connected to recessed contacts 40 which are adapted to receive the prongs of an electrical plug. At the left end of the hose and adjacent to coupling 12, the electrical conductors 30 and 32 are connected to a two-conductor electric cord 42 which is provided at its end with a male plug 44.

While we have shown and described one more or less specific embodiment of our invention, it is to be understood that this has been done for purposes of illustration only and that the scope of our invention is not to be limited thereto, but is to be determined from the appended claims.

What we claim is:

1. In a suction hose having per unit length a given number of turns of reinforcing wire at a given pitch the improvement comprising at least three coaxially arranged multi-turn helical reinforcing coils haivng said given number of turns per unit length of hose and extending the length of said hose, each said helical coil having its turns serially interspersed with the turns of the other helical coils thereby defining adjacent coaxially arranged turns of reinforcing wire having an apparent pitch substantially equal to said given pitch, an airtight carcass surrounding said helical coils, said carcass extending radially inwardly between the adjacent individual reinforcing wires for forming on the outside of the hose carcass a series of discrete coaxially arranged helical grooves, said grooves having a pitch which is greater than said apparent pitch by a multiple equal to the number of said reinforcing wires, a plurality of electric conductors, each conductor of said plurality being located in a different one of said helical grooves, the number of said conductors being less than the number of said grooves.

2. A suction hose according to claim 1 wherein all of said helical coils of reinforcing wire have substantially the same pitch.

3. A suction hose according to claim 1 wherein at least one helical groove which is not occupied by a conductor separates said conductors.

4. A suction hose according to claim 1 with the addition of means for retaining said conductors in said grooves.

5. A suction hose according to claim 4 wherein said means comprises a sheath covering the outside of said carcass and retaining said conductors in said grooves.

References Cited by the Examiner

UNITED STATES PATENTS

| | | | |
|---|---|---|---|
| 2,810,400 | 10/1957 | Hewitt | 156—143 X |
| 2,895,001 | 7/1959 | Noyes et al. | 138—134 X |
| 3,211,823 | 10/1965 | Brown et al. | 174—47 |

FOREIGN PATENTS

| | | |
|---|---|---|
| 797,500 | 7/1958 | Great Britain. |
| 862,660 | 3/1961 | Great Britain. |

LEWIS H. MYERS, *Primary Examiner.*

J. F. RUGGIERO, *Assistant Examiner.*